United States Patent
Mori et al.

(10) Patent No.: US 12,533,854 B2
(45) Date of Patent: Jan. 27, 2026

(54) METHOD OF FIXING HOUSING

(71) Applicant: Mitsubishi Electric Corporation, Tokyo (JP)

(72) Inventors: Kento Mori, Tokyo (JP); Nobuo Yokomura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 186 days.

(21) Appl. No.: 17/998,794

(22) PCT Filed: Jul. 15, 2020

(86) PCT No.: PCT/JP2020/027430
§ 371 (c)(1),
(2) Date: Nov. 14, 2022

(87) PCT Pub. No.: WO2022/013957
PCT Pub. Date: Jan. 20, 2022

(65) Prior Publication Data
US 2023/0191716 A1    Jun. 22, 2023

(51) Int. Cl.
*B29C 65/02* (2006.01)
*B29C 65/00* (2006.01)
(Continued)

(52) U.S. Cl.
CPC ........ *B29C 66/12423* (2013.01); *B29C 65/02* (2013.01); *B29C 65/56* (2013.01);
(Continued)

(58) Field of Classification Search
CPC ......... B29C 65/02; B29C 65/08; B29C 65/56; B29C 65/7802; B29C 65/7814;
(Continued)

(56) References Cited

U.S. PATENT DOCUMENTS 6,627,872 B1 *  9/2003  FuKamura ............ H10F 77/407
                                                        257/E31.118
2013/0242487 A1  9/2013  Fujioka et al.
(Continued)

FOREIGN PATENT DOCUMENTS

CN      110832958 A     2/2020
JP      H10-004277 A    1/1998
(Continued)

OTHER PUBLICATIONS

International Search Report issued in PCT/JP2020/027430; mailed Oct. 6, 2020.
(Continued)

*Primary Examiner* — Michael A Tolin
(74) *Attorney, Agent, or Firm* — Studebaker Brackett PLLC

(57) ABSTRACT

There are included: a step of adjusting, on a surface of a base plate, the position of a housing which is made of a resin and is placed on the base plate so as to partially cover that base plate, to an extent that a contact portion of the housing with the base plate is kept straddling a groove that is formed on the surface of the base plate and has a width smaller than a width of the contact portion; a step of heating the base plate or the contact portion of the housing with the base plate while pressing the housing against the base plate; and a step of cooling the thus-heated base plate or contact portion of the housing with the base plate. This makes it possible to significantly improve the accuracy of the position adjustment.

13 Claims, 13 Drawing Sheets

(51) Int. Cl.
  *B29C 65/56* (2006.01)
  *B29C 65/78* (2006.01)
  *B32B 7/04* (2019.01)
  *B32B 37/04* (2006.01)
  *B32B 38/18* (2006.01)

(52) U.S. Cl.
  CPC .... *B29C 65/7802* (2013.01); *B29C 66/02241* (2013.01); *B29C 66/12421* (2013.01); *B29C 66/12425* (2013.01); *B29C 66/232* (2013.01); *B29C 66/30325* (2013.01); *B32B 7/04* (2013.01); *B32B 37/04* (2013.01); *B32B 38/1833* (2013.01)

(58) Field of Classification Search
  CPC ... B29C 66/02; B29C 66/022; B29C 66/0224; B29C 66/02241; B29C 66/02242; B29C 66/12; B29C 66/124; B29C 66/1242; B29C 66/12421; B29C 66/12423; B29C 66/12425; B29C 66/1244; B29C 66/12441; B29C 66/12443; B29C 66/12445; B29C 66/12449; B29C 66/1246; B29C 66/12461; B29C 66/12463; B29C 66/12464; B29C 66/12469; B29C 66/21; B29C 66/227; B29C 66/2272; B29C 66/2274; B29C 66/2276; B29C 66/232; B29C 66/301; B29C 66/303; B29C 66/3032; B29C 66/30321; B29C 66/30325; B29C 66/474; B32B 7/04; B32B 7/08; B32B 37/04; B32B 37/06; B32B 37/08; B32B 38/10; B32B 38/105; B32B 38/1825; B32B 38/1833; G01D 11/245
  See application file for complete search history.

(56) References Cited

U.S. PATENT DOCUMENTS

2016/0167353 A1* 6/2016 Fan ............................ B32B 7/04
                                                                    156/309.9
2017/0361540 A1* 12/2017 Li .......................... B29C 66/742

FOREIGN PATENT DOCUMENTS

| JP | 2006-261598 A | 9/2006 | |
| JP | 2009-271457 A | 11/2009 | |
| JP | 3213707 U | 11/2017 | |
| KR | 10-2013-0136490 A | 12/2013 | |
| KR | 10-2016-0135900 A | 11/2016 | |
| WO | WO-2019012898 A1 * | 1/2019 | ............. B29C 65/18 |

OTHER PUBLICATIONS

"Notice of Reasons for Refusal" Office Action issued in JP 2020-567990; mailed by the Japanese Patent Office on Mar. 16, 2021.

Office Action issued in TW 110114656; mailed by the Taiwan Intellectual Property Office on Oct. 29, 2021.

An Office Action mailed by the Korean Intellectual Property Office on Jul. 3, 2024, which corresponds to Korean Patent Application No. 10-2022-7044893 and is related to U.S. Appl. No. 17/998,794; with English language translation.

An Office Action; mailed by the China National Intellectual Property Administration of the People's Republic of China on Dec. 27, 2024, which corresponds to Chinese Patent Application No. 202080102701.X and is related to U.S. Appl. No. 17/998,794.

* cited by examiner

METHOD OF FIXING HOUSING

TECHNICAL FIELD

The present application relates to a method of fixing a housing.

BACKGROUND ART

According to a conventional housing fixing method and a structure for that method, a protrusion to be engaged with a groove (or hole) is provided in a housing, and the position of the housing is fixed after the protrusion is so engaged (see, for example, Patent Document 1).

CITATION LIST

Patent Document

Patent Document 1: Japanese Patent Application Laid-open No. 2006-261598 (Paragraph 0023)

SUMMARY OF THE INVENTION

Problems to be Solved by the Invention

However, according to the fixing method as disclosed in Patent Document 1, since the fixed position is determined depending on positions where the protrusion and the groove (or hole) for engaging the protrusion are provided, there is a problem that accurate adjustment of the position cannot be achieved beyond the processing accuracy of the protrusion and the groove (or hole) for engaging the protrusion. Further, since a solder or an adhesive has to be used for fixing the position, there is a problem that a material cost and a material management cost of that solder or adhesive are generated.

This application discloses a technique for solving the problems as described above, and an object thereof is to provide a housing fixing method in which the position of the housing is adjusted before the position of the housing is fixed.

Means for Solving the Problems

In another aspect, a method of fixing a housing disclosed in this application is characterized by comprising: a step of adjusting a position of a housing, which is made of a resin and is placed on a base plate so as to partially cover the base plate, to an extent that a contact portion of the housing that is flat and in contact with the base plate is kept straddling a hole that is formed on the surface of the base plate and has a diameter smaller than a width of the contact portion; a step of heating the base plate or the contact portion of the housing with the base plate while pressing the housing against the base plate, to thereby deform the flat contact portion of the housing so that the contact portion is partially embedded in the hole; and a step of cooling the thus-heated base plate or contact portion of the housing with the base plate.

Effect of the Invention

According to this application, in comparison with the case where the position has been determined beforehand by the engagement of a groove and its corresponding protrusion, the accuracy of the position adjustment is improved significantly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

BRIEF DESCRIPTION OF THE DRAWINGS

FIG. 3 is a flowchart showing steps in the method of fixing a housing according to Embodiment 1.

FIG. 4 is a cross-sectional view showing a state after fixing by a conventional housing fixing method.

MODES FOR CARRYING OUT THE INVENTION

Embodiment 1

Figure 1A:
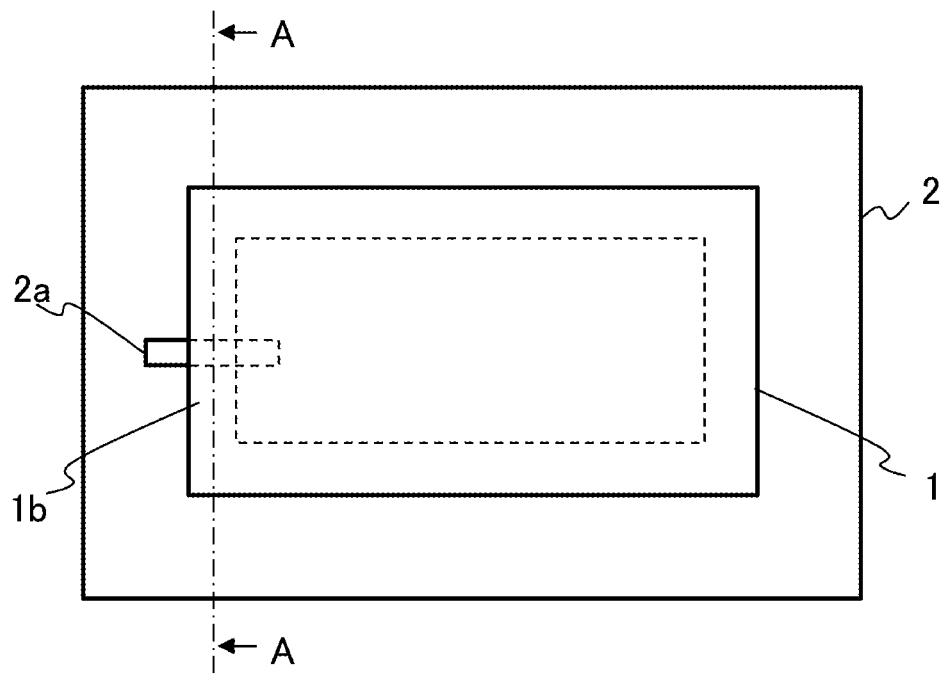
FIG. 1A and FIG. 1B are a set of plan and cross-sectional views showing a state after fixing by a method of fixing a housing according to Embodiment 1.
Figure 1B:
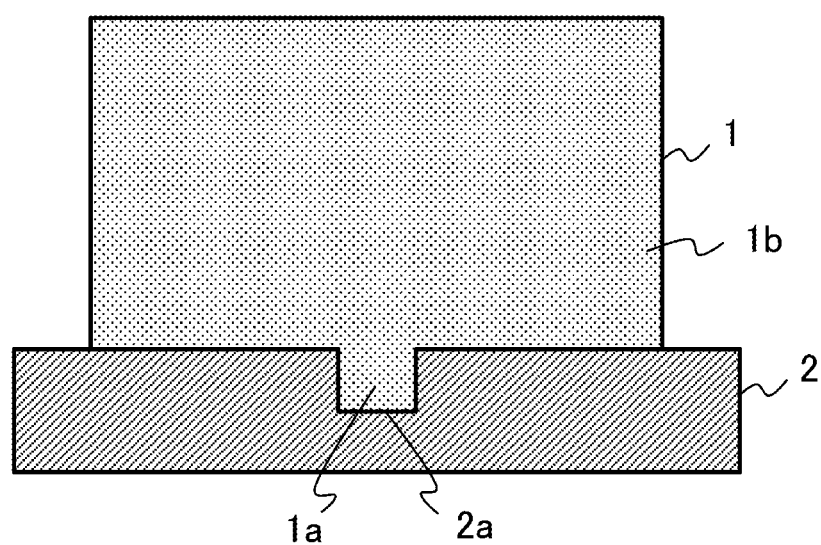

FIG. 1 and FIG. 1B are diagrams showing a housing fixed on a base plate by a method of fixing a housing according to Embodiment 1 of this application. FIG. 1A is a plan view and FIG. 1B is an A-A arrow directional cross-sectional view of FIG. 1A. As shown in FIG. 1A and FIG. 1B, a housing 1 is fixed in a state in which a contact portion with a base plate 2, of a wall 1b as a part of the housing 1 is partially embedded in a groove 2a that is dug in the surface of the base plate 2.

The housing 1 is made of a resin and is fixed to the base plate 2 in such a manner that, in a state in which the position of the housing has been adjusted on the base plated 2, the contact portion is melted by heating and, in the melted state, the housing is pressed against the base plate 2, so that the contact portion of the housing 1 is so embedded in the groove 2a that is dug in the surface of the base plate 2 to form an embedded portion 1a.

The base plate 2 has the groove 2a whose shape in cross-section across the direction of the groove is a rectangle or a square. The groove 2a is formed at a position where the contact portion of the housing 1 intersects and straddles that groove. The width of the groove 2a has to be narrower than the wall thickness of the contact portion of the housing 1. The groove 2a may penetrate through the base plate 2 and may be dug in any given direction. A forming method of the groove is performed using laser machining, etching, blast processing, a router, a drill, an end mill, or the like. The groove may be formed as a plating pattern on the surface of the base plate.

Figure 2A:
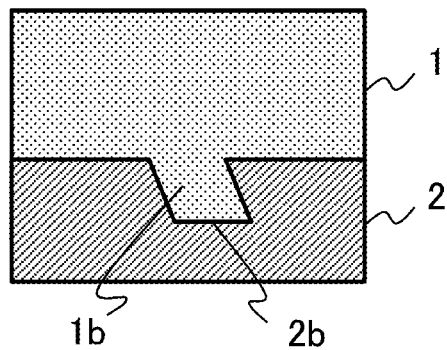
FIG. 2A to FIG. 2F are a set of partial cross-sectional views each showing another state after fixing by the method of fixing a housing according to Embodiment 1.
Figure 2D:
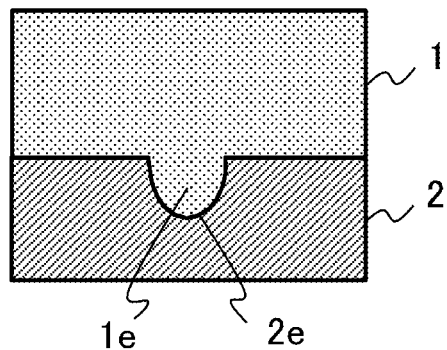
Figure 2B:
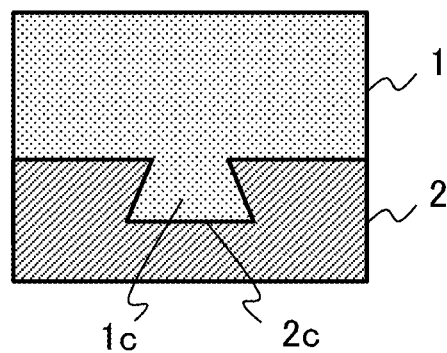
Figure 2E:
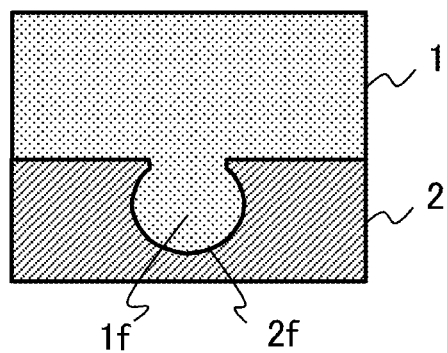
Figure 2C:
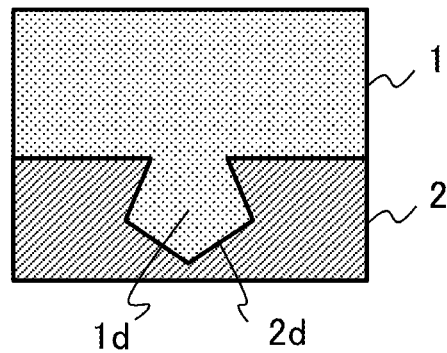
Figure 2F:
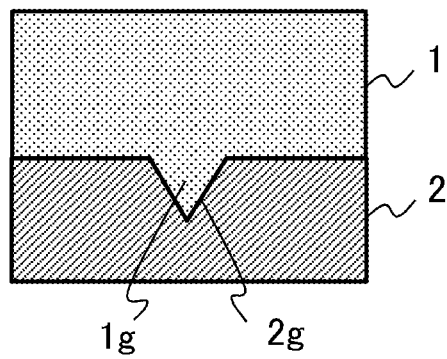

It is noted that, in Embodiment 1, the shape of the groove 2a in cross-section across the direction of that groove is a rectangle or a square; however, it is not limited thereto. As shown in FIG. 2A to FIG. 2F, the shape of the groove in cross-section across the direction of that groove may be a parallelogram (FIG. 2A), a quadrilateral in which its side at the bottom portion of the groove is longer than its side on the surface of the base plate (FIG. 2B), a pentagon or polygon having sides more than a pentagon (FIG. 2C), a U-like shape (FIG. 2D), a circular shape (FIG. 2E) or a V-like shape (FIG. 2F).

Next, a method of fixing a housing according to Embodiment 1 of this application will be described. FIG. 3 is a flowchart showing steps in the method of fixing a housing.

In order to fix the housing 1 at a specified position, first of all, the position of the housing is adjusted (Step S301). For example, in a state in which an optical component on the base plate 2 is activated, the position of a lens incorporated in the housing 1 is subjected to active alignment. The position of the housing 1 is adjusted to the extent that the contact portion of the housing 1 with the base plate 2 is kept straddling the groove that is formed on the surface of the base plate 2 and has a width smaller than the width of the contact portion. At this moment, the base plate 2 and the housing 1 are not bonded to each other.

Then, the base plate 2 or the contact portion of the housing 1 with the base plate 2 is heated while the housing 1 is being pressed against the base plate 2 (Step S301). After the position of the housing 1 is adjusted, the base plate 2 or the contact portion of the housing 1 with the base plate 2 is heated to a temperature that is not less than a temperature at which the contact portion of the housing is softened, to thereby place the contact portion of the housing 1 in a flowable state and, in this state, a pressure is applied thereto. As the result, a part of the housing 1 softened by heating is deformed to a shape created by its introduction into the groove 2a that is provided on the base plate 2, to thereby form the embedded portion 1a.

Lastly, the embedded portion 1a that is formed using the groove 2a from the thermally-melted contact portion of the housing 1, is cooled to be solidified (Step S303). When it is cooled, because of an anchor effect, the position of the housing 1 is fixed. Note that the position can be fixed so long as there is no such misalignment in the position adjustment by which any part of the contact portion of the housing 1 cannot be introduced into the groove.

According to the conventional housing fixing method, as shown, for example, in FIG. 4, when the 41 resin-made position of a housing with a lens incorporated therein is to be fixed on a base plate with a sensor or like optical component mounted thereon, if the position is fixed by the engagement of a protrusion provided on the housing and a groove provided on the base plate, or a groove provided on the housing and a protrusion provided on the base plate, the relative position between a lens 3 (whose center is C1) and an optical component 4 (whose center is C2) is determined depending on the forming accuracy of a protrusion 1p and a groove 2g.

By the method of fixing a housing according to Embodiment 1, in a state in which the position has been determined highly accurately, a pressurizing and heating process is performed, so that a softened part of the housing's contact portion is introduced into the groove 2a and then, due to an anchor effect, the position of the housing 1 is fixed on the base plate 2.

This method makes it possible to fix the housing 1 in a state in which the position adjustment has been performed accurately. As a result, in comparison with the case where the position has been determined beforehand by the engagement t of a groove and its corresponding protrusion, the accuracy of the position adjustment is improved significantly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

As described above, the method of fixing a housing according to Embodiment 1 comprises: a step of adjusting, on the surface of the base plate 2, the position of the housing 1, which is made of a resin and is placed on the base plate 2 so as to partially cover the base plate 2, to the extent that a contact portion of the housing 1 with the base plate 2 is kept straddling the groove 2a that is formed on the surface of the base plate 2 and has a width smaller than the width of the contact portion; a step of heating the base plate 2 or the contact portion of the housing 1 with the base plate 2 while pressing the housing 1 against the base plate 2; and a step of cooling the thus-heated base plate 2 or contact portion of the housing 1 with the base plate 2. Thus, in comparison with the case where the position has been determined beforehand by the engagement of a groove and its corresponding protrusion, the accuracy of the position adjustment is improved significantly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

Embodiment 2

In Embodiment 1, with respect to the contact portion of the housing 1, the groove 2a is formed on the surface of the base plate 2, whereas in Embodiment 2, a case will be described where a hole is instead formed thereon.

Figure 5A:
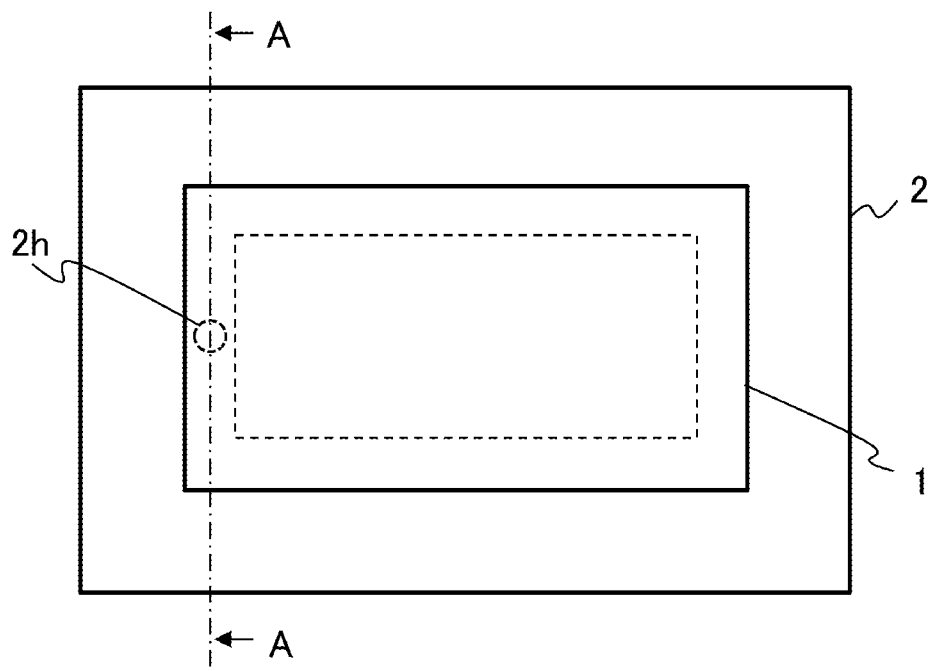
FIG. 5A and FIG. 5B are a set of plan and cross-sectional views showing a state after fixing by a method of fixing a housing according to Embodiment 2.
Figure 5B:
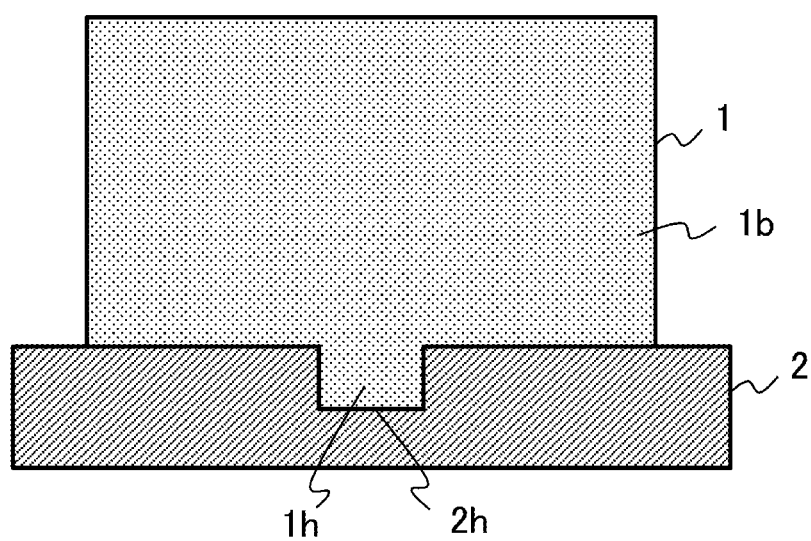

FIG. 5A and FIG. 5B are diagrams showing a housing fixed on a base plate by a method of fixing a housing according to Embodiment 2 of this application. FIG. 5A is a plan view and FIG. 5B is an A-A arrow directional cross-sectional view of FIG. 5A. As shown in FIG. 5A and FIG. 5B, a housing 1 is fixed to the base plate 2, in a state in which a contact portion with a base plate 2, of a wall 1b as a part of the housing 1 is partially embedded in a hole 2h that is dug in the surface of the base plate 2, to form an embedded portion 1h.

The base plate 2 has the hole 2h whose shape in vertical section is a rectangle or a square. The diameter of the hole 2h has to be smaller than the wall thickness of the contact portion of the housing 1. The hole 2h may penetrate through the base plate 2. A forming method of the hole is performed using laser machining, etching, blast processing, a router, a drill, an end mill, or the like. The holemay be formed as a plating pattern on the surface of the base plate.

Figure 6A:
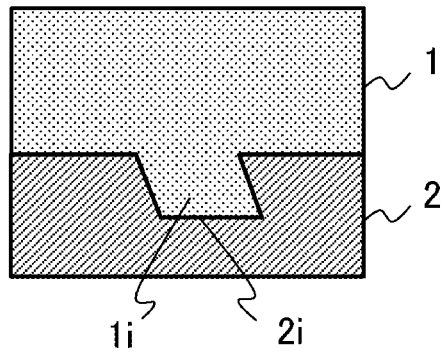
FIG. 6A to FIG. 6F are a set of partial cross-sectional views each showing another state after fixing by the method of fixing a housing according to Embodiment 2.
Figure 6D:
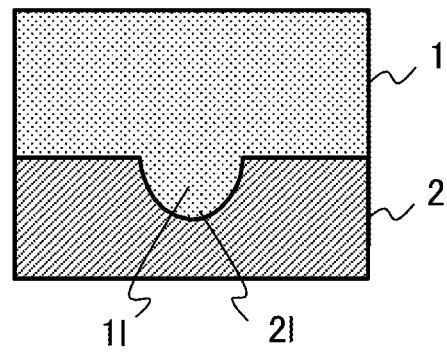
Figure 6B:
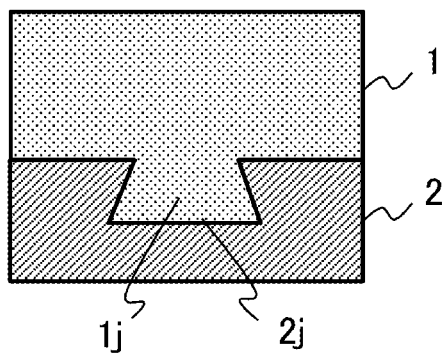
Figure 6E:
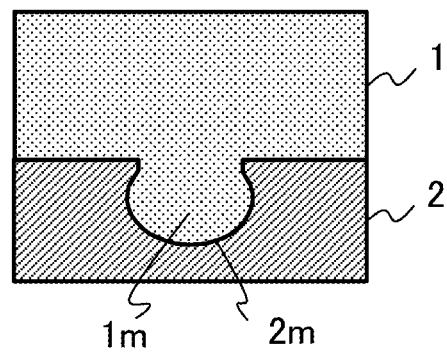
Figure 6C:
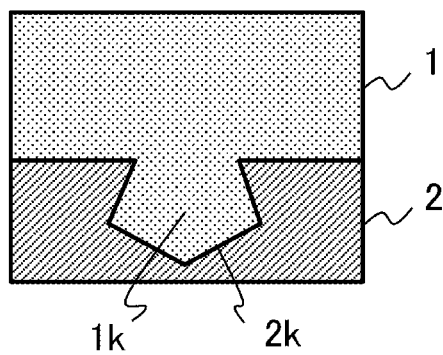
Figure 6F:
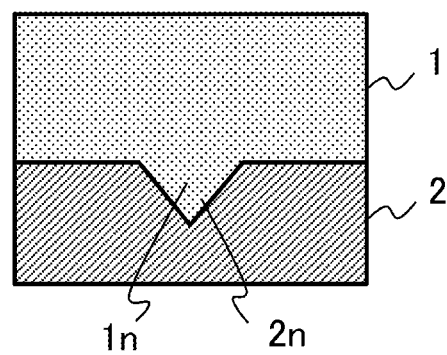

It is noted that, in Embodiment 2, the shape of the hole 2h in vertical section is a rectangle or a square; however, it is not limited thereto. As shown in FIG. 6A to FIG. 6F, the shape of the hole in vertical section may be a parallelogram (FIG. 6A), a quadrilateral in which its side at the bottom portion of the groove is longer than its side on the surface of the base plate (FIG. 6B), a pentagon or polygon having sides more than a pentagon (FIG. 6C), a U-like shape (FIG. 6D), a circular shape (FIG. 6E) or a V-like shape (FIG. 6F).

With respect to the method of fixing a housing according to Embodiment 2 of this application, in its step corresponding to the position adjustment step in FIG. 3 (Step S301), the position of the housing 1 is adjusted to the extent that the contact portion of the housing 1 with the base plate 2 is kept straddling the hole that is formed on the surface of the base plate 2 and has a diameter smaller than the width of the contact portion. In the method of fixing a housing according to Embodiment 2, the other steps (pressurizing and heating step (Step S302), cooling step (Step S303)) are the same as those in the method of fixing a housing according to Embodiment 1, so that description thereof will be omitted. Note that the position can be fixed so long as there is no such misalignment in the position adjustment by which any part of the contact portion of the housing 1 cannot be introduced into the hole.

As described above, the method of fixing a housing according to Embodiment 2 comprises: a step of adjusting, on the surface of the base plate 2, the position of the housing 1, which is made of a resin and is placed on the base plate 2 so as to partially cover the base plate 2, to the extent that a contact portion of the housing 1 with the base plate 2 is kept straddling the hole 2h that is formed on the surface of the base plate 2 and has a diameter smaller than the width of the contact portion; a step of heating the base plate 2 or the contact portion of the housing 1 with the base plate 2 while pressing the housing 1 against the base plate 2; and a step of cooling the thus-heated base plate 2 or contact portion of the housing 1 with the base plate 2. Thus, in comparison with the case where the position has been determined beforehand by the engagement of a hole and its corresponding protrusion, the accuracy of the position adjustment is improved significantly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

Embodiment 3

In Embodiment 1, one groove 2a is formed, whereas in Embodiment 3, a case will be described where multiple grooves are formed.

Figure 7A:
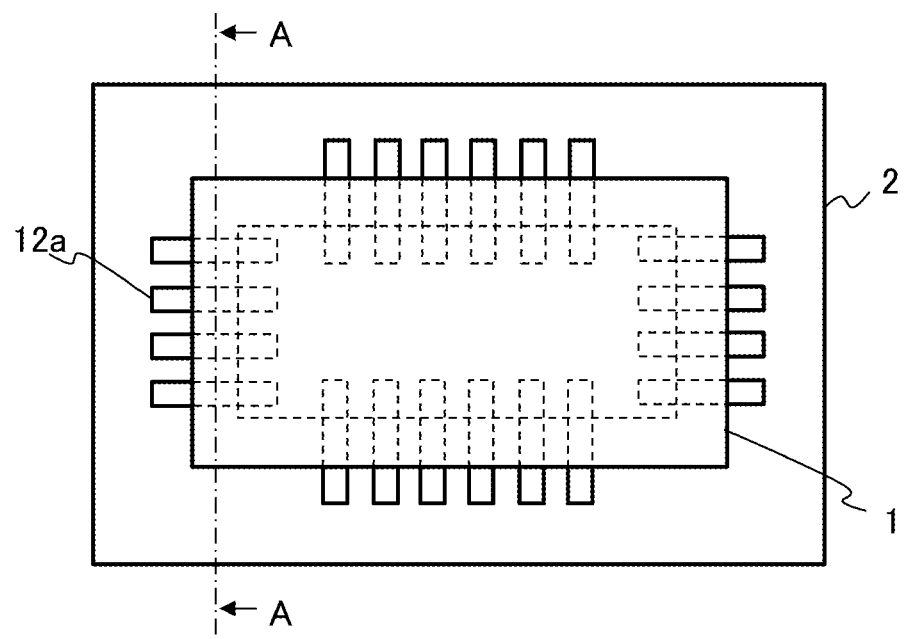
FIG. 7A and FIG. 7B are a set of plan and cross-sectional views showing a state after fixing by a method of fixing a housing according to Embodiment 3.
Figure 7B:
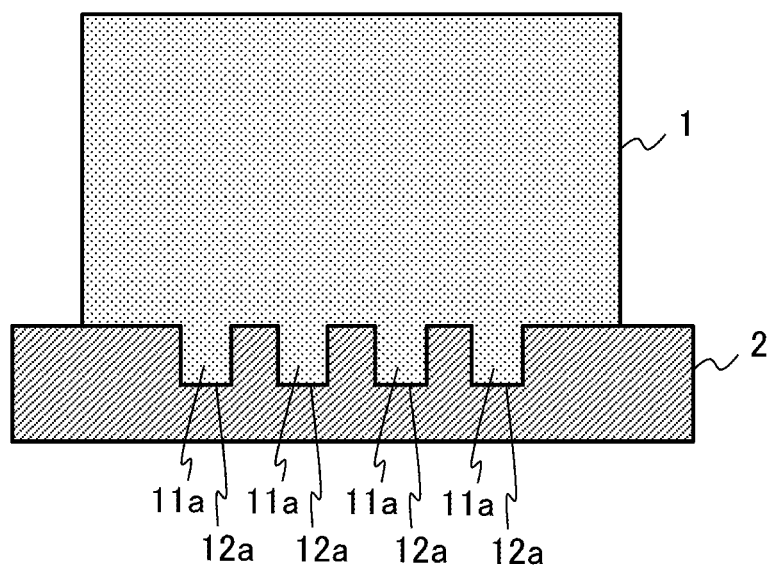

FIG. 7A and FIG. 7B are diagrams showing a housing fixed on a base plate by a method of fixing a housing according to Embodiment 3 of this application. FIG. 7A is a plan view and FIG. 7B is an A-A arrow directional cross-sectional view of FIG. 7A. As shown in FIG. 7A and FIG. 7B, a housing 1 is fixed to a base plate 2, in a state in which a contact portion of the housing 1 with the base plate 2 is partially embedded in multiple grooves 12a that are dug in the surface of the base plate 2, to form embedded portions 11a.

The base plate 2 has the multiple grooves 12a whose respective shapes in cross-section across the directions of the respective grooves are each a rectangle or a square. The multiple grooves 12a are each formed at a position where the contact portion of the housing 1 intersects and straddles that groove. The width of the groove 12a has to be narrower than the wall thickness of the contact portion of the housing 1. The groove 12a may penetrate through the base plate 2. The grooves 12a may be dug in different directions. A forming method of these grooves is performed using laser machining, etching, blast processing, a router, a drill, an end mill, or the like. These grooves may be formed as a plating pattern on the surface of the base plate.

Figure 8A:
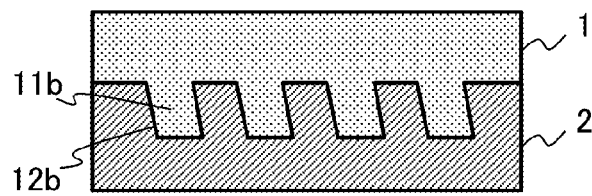
FIG. 8A to FIG. 8F are a set of partial cross-sectional views each showing another state after fixing by the method of fixing a housing according to Embodiment 3.
Figure 8B:
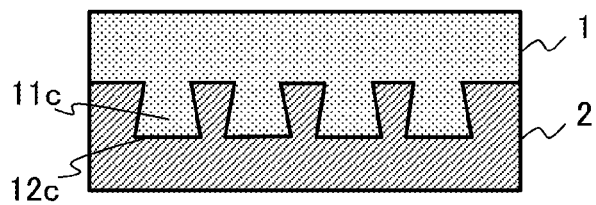
Figure 8C:
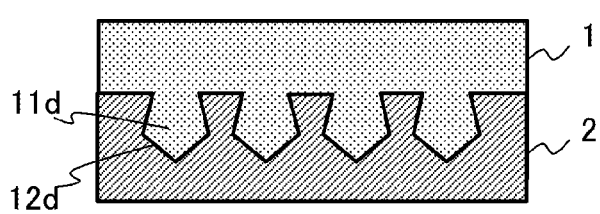
Figure 8D:
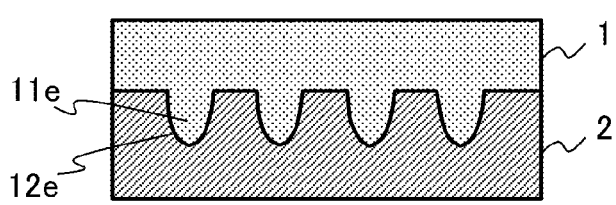
Figure 8E:
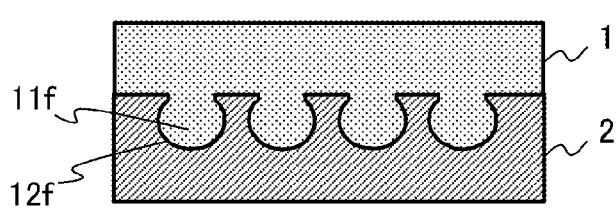
Figure 8F:
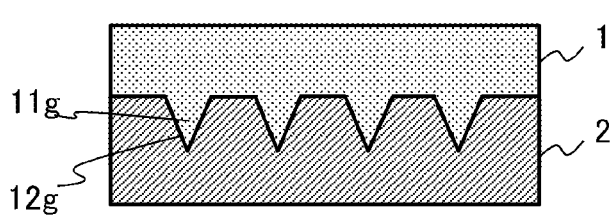

It is noted that, in Embodiment 3, the shape of each of the multiple grooves 12a in cross-section across the direction of that groove is a rectangle or a square; however, it is not limited thereto. As shown in FIG. 8A to FIG. 8F, the shape of each groove in cross-section across the direction of that groove may be a parallelogram (FIG. 8A), a quadrilateral in which its side at the bottom portion of the groove is longer than its side on the surface of the base plate (FIG. 8B), a pentagon or polygon having sides more than a pentagon (FIG. 8C), a U-like shape (FIG. 8D), a circular shape (FIG. 8E) or a V-like shape (FIG. 8F).

The method of fixing a housing according to Embodiment 3 is similar to the method of fixing a housing according to Embodiment 1, so that description thereof will be omitted. Note that the position can be fixed so long as there is no such misalignment in the position adjustment by which any part of the contact portion of the housing 1 cannot be introduced into the groove. In other words, the position can be fixed so long as a part of the contact portion of the housing 1 is introduced into at least one of the grooves.

As described above, by the method of fixing a housing according to Embodiment 3, since the multiple grooves 12a are provided, it is possible not only to significantly improve the accuracy of the position adjustment, but also to firmly fix the position because the bonding area is increased accordingly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

Embodiment 4

In Embodiment 2, one hole 2h is formed, whereas in Embodiment 4, a case will be described where multiple holes are formed.

Figure 9A:
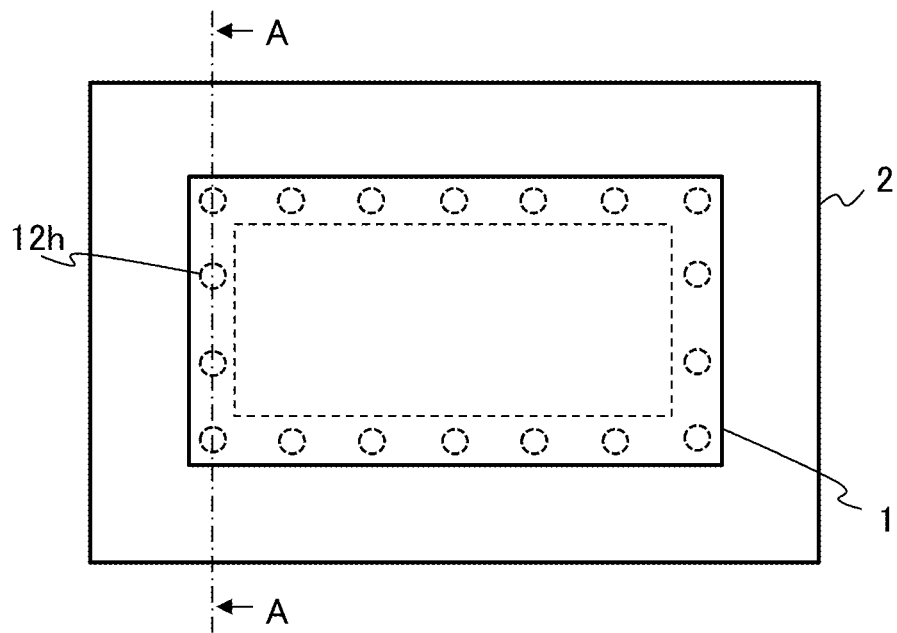
FIG. 9A and FIG. 9B a set of plan and cross-sectional views showing a state after fixing by a method of fixing a housing according to Embodiment 4.
Figure 9B:
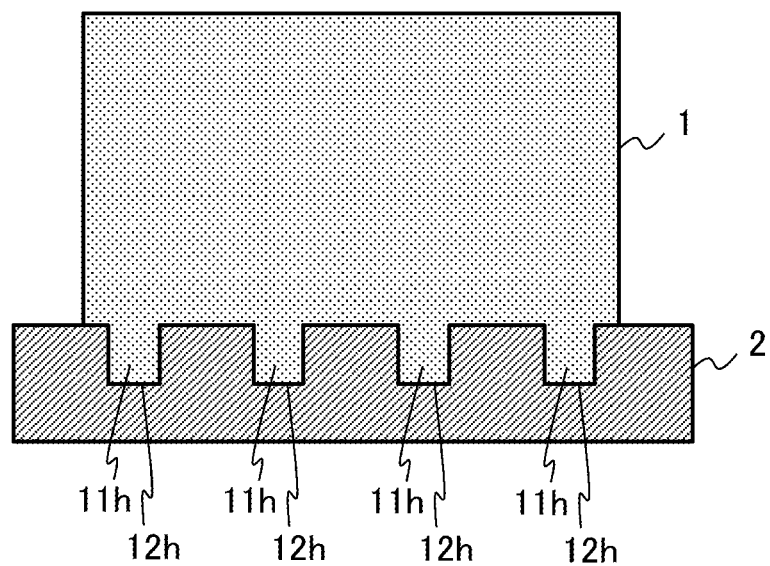

FIG. 9A and FIG. 9B are diagrams showing a housing fixed on a base plate by a method of fixing a housing according to Embodiment 4 of this application. FIG. 9A is a plan view and FIG. 9B is an A-A arrow directional cross-sectional view of FIG. 9A. As shown in FIG. 9A and FIG. 9B, a housing 1 is fixed to a base plate 2, in a state in which a contact portion of the housing 1 with the base plate 2 is partially embedded in multiple holes 12a that are dug in the surface of the base plate 2, to form embedded portions 11h.

The base plate 2 has the holes 12*h* whose respective shapes in vertical section are each a rectangle or a square. The multiple holes 12*h* are each formed at a position where the contact portion of the housing 1 straddles that hole. The diameter of the hole 12*h* has to be smaller than the wall thickness of the contact portion of the housing 1. The hole 12*h* may penetrate through the base plate 2. A forming method of these holes is performed using laser machining, etching, blast processing, a router, a drill, an end mill, or the like. The holes may be formed as a plating pattern on the surface of the base plate.

Figure 10A:
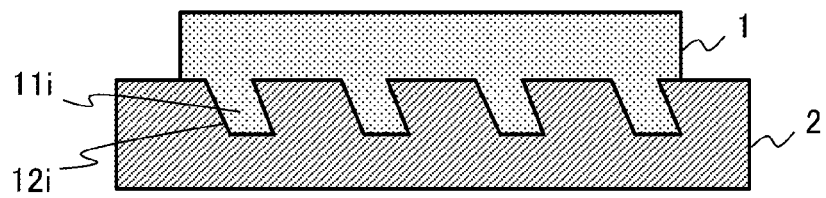
FIG. 10A to FIG. 10F are a set of partial cross-sectional views each showing another state after fixing by the method of fixing a housing according to Embodiment 4.
Figure 10B:
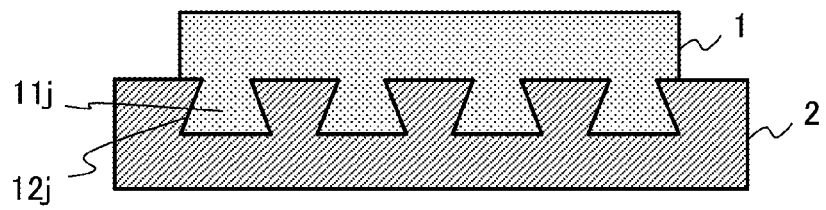
Figure 10C:
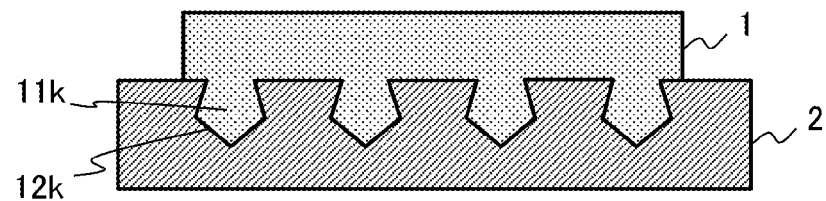
Figure 10D:
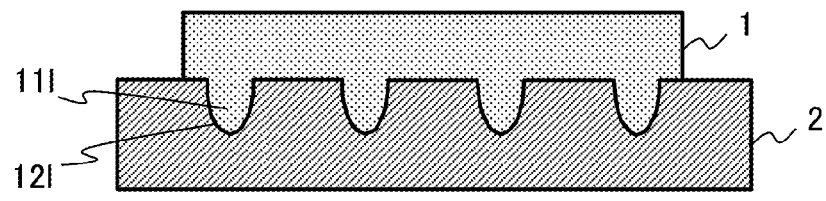
Figure 10E:
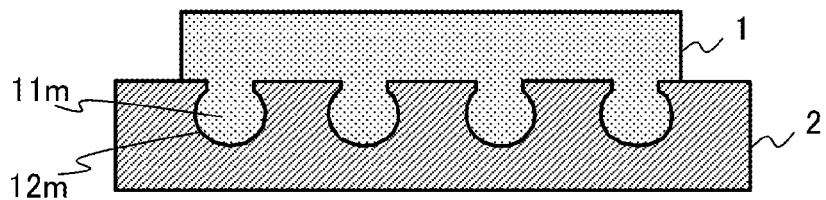
Figure 10F:
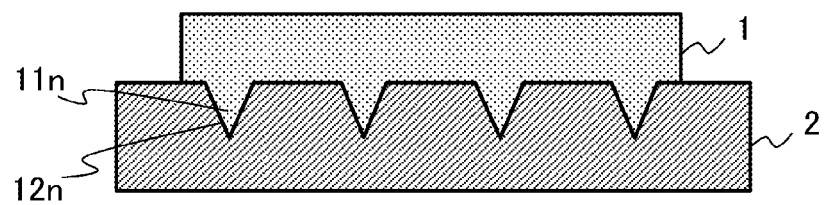

It is noted that, in Embodiment 4, the shape of each of the multiple holes 12*h* in vertical section is a rectangle or a square; however, it is not limited thereto. As shown in FIG. 10A to FIG. 10F, the shape of each hole in vertical section may be a parallelogram (FIG. 10A), a quadrilateral in which its side at the bottom portion of the groove is longer than its side on the surface of the base plate (FIG. 10B), a pentagon or polygon having sides more than a pentagon (FIG. 10C), a U-like shape (FIG. 10D), a circular shape (FIG. 10E) or a V-like shape (FIG. 10F).

The method of fixing a housing according to Embodiment 4 is similar to the method of fixing a housing according to Embodiment 2, so that description thereof will be omitted. Note that the position can be fixed so long as there is no such misalignment in the position adjustment by which any part of the contact portion of the housing 1 cannot be introduced into the hole. In other words, the position can be fixed so long as a part of the contact portion of the housing 1 is introduced into at least one of the holes.

As described above, by the method of fixing a housing according to Embodiment 4, since the multiple holes 12*h* are provided, it is possible not only to significantly improve the accuracy of the position adjustment, but also to firmly fix the position because the bonding area is increased accordingly. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

Embodiment 5

In Embodiment 3, the multiple grooves 12*a* are each formed at a position where the contact portion of the housing 1 intersects and straddles that groove, whereas in Embodiment 5, a case will be described where a groove is formed at a position so that the contact portion extends along the groove while straddling it.

Figure 11A:
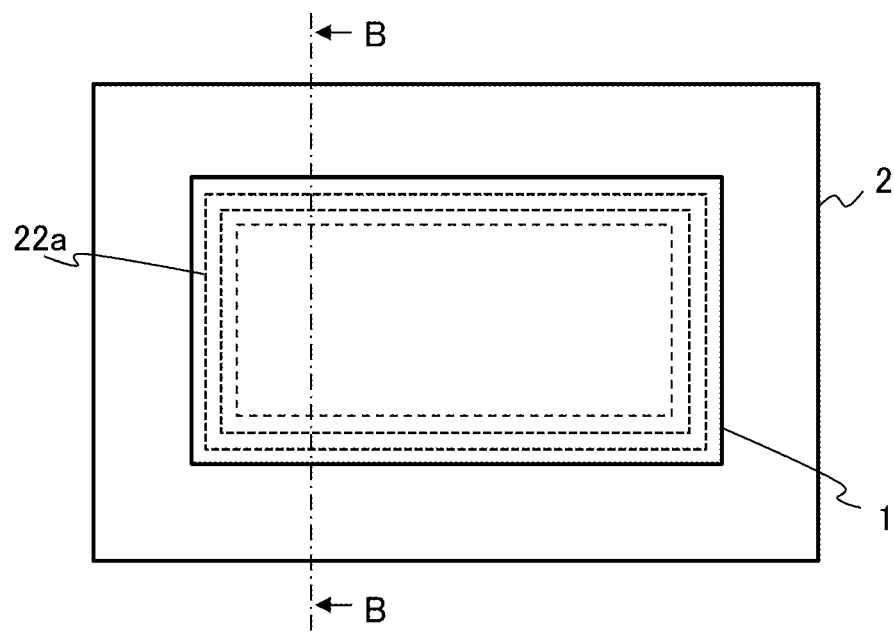
FIG. 11A and FIG. 11B are a set of plan and cross-sectional views showing a state after fixing by a method of fixing a housing according to Embodiment 5.
Figure 11B:
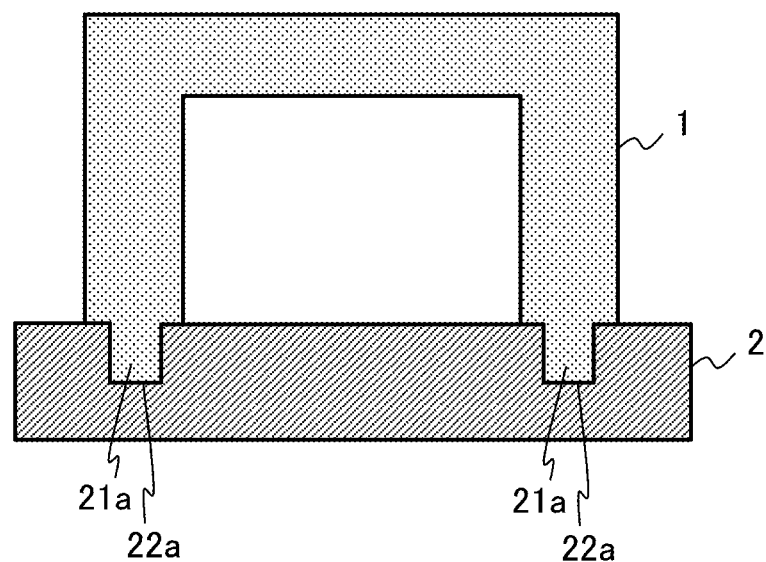

FIG. 11A and FIG. 11B are diagrams showing a housing fixed on a base plate by a method of fixing a housing according to Embodiment 5 of this application. FIG. 11A is a plan view and FIG. 11B is a B-B arrow directional cross-sectional view of FIG. 11A. As shown in FIG. 11A and FIG. 11B, a housing 1 is fixed to a base plate 2, in a state in which a contact portion of the housing 1 with the base plate 2 is partially embedded in a pattern of a groove 22*a* that is dug in the surface of the base plate 2, to form an embedded portion 21*a*.

The base plate 2 has the groove 22*a* whose shape in cross-section across the direction of the groove is a rectangle or a square. The groove 22*a* is formed at a position so that the contact portion of the housing 1 extends along the groove 22*a* while straddling it. The width of the groove 22*a* has to be narrower than the wall thickness of the contact portion of the housing 1. The groove 22*a* may penetrate through the base plate 2. A forming method of the groove is performed using laser machining, etching, blast processing, a router, a drill, an end mill, or the like. The groove may be formed as a plating pattern on the surface of the base plate.

Figure 12A:
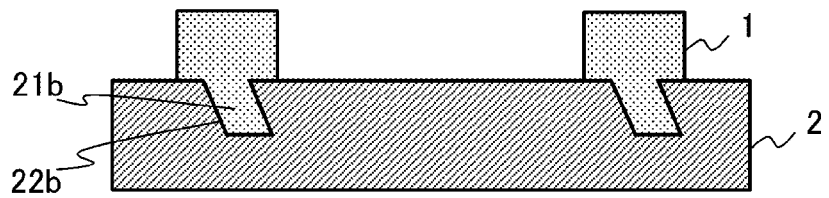
FIG. 12A to FIG. 12F are a set of partial cross-sectional views each showing another state after fixing by the method of fixing a housing according to Embodiment 5.
Figure 12B:
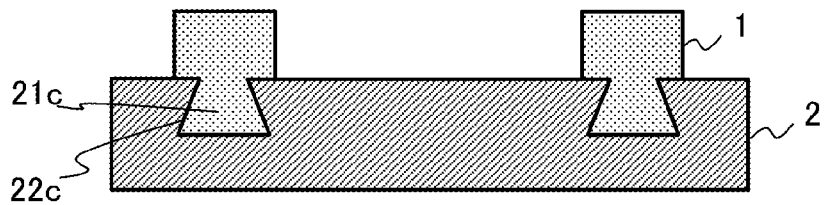
Figure 12C:
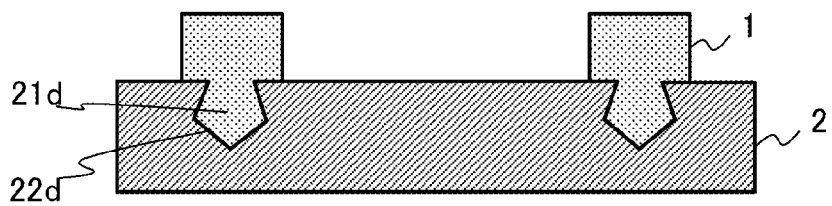
Figure 12D:
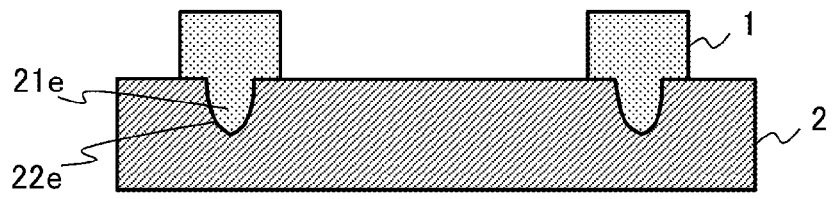
Figure 12E:
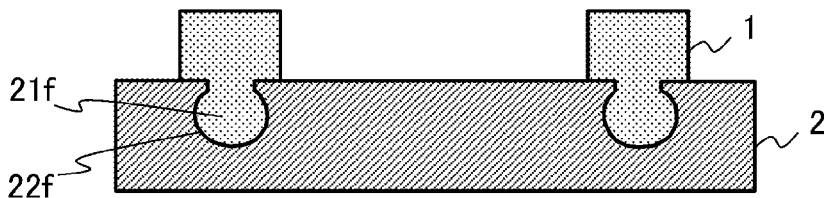
Figure 12F:
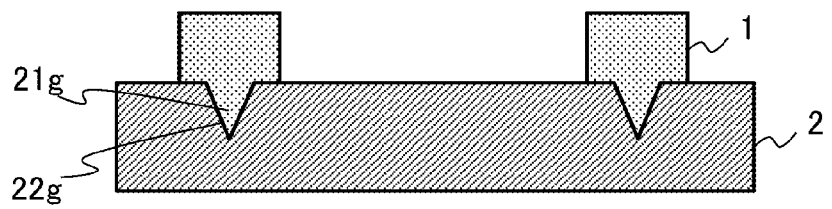

It is noted that, in Embodiment 5, the shape of the groove 22*a* in cross-section across the direction of the groove is a rectangle or a square; however, it is not limited thereto. As shown in FIG. 12A to FIG. 12F, the shape of the groove in cross-section across the direction of the groove may be a parallelogram (FIG. 12A), a quadrilateral in which its side at the bottom portion of the groove is longer than its side on the surface of the base plate (FIG. 12B), a pentagon or polygon having sides more than a pentagon (FIG. 12C), a U-like shape (FIG. 12D), a circular shape (FIG. 12E) or a V-like shape (FIG. 12F).

Figure 13A:
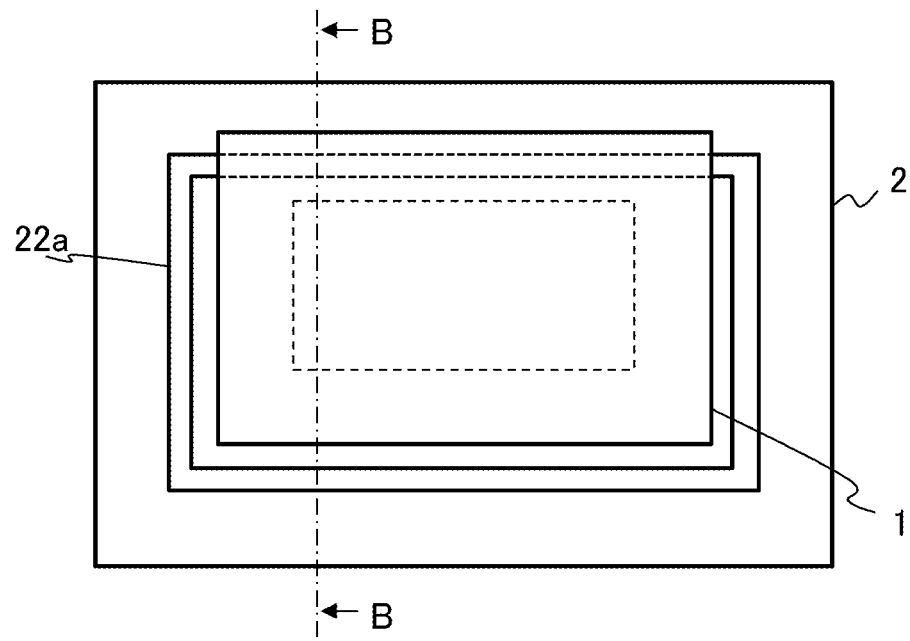
FIG. 13A and FIG. 13B are a set of plan and cross-sectional views showing a state after fixing by another method of fixing a housing according to Embodiment 5.
Figure 13B:
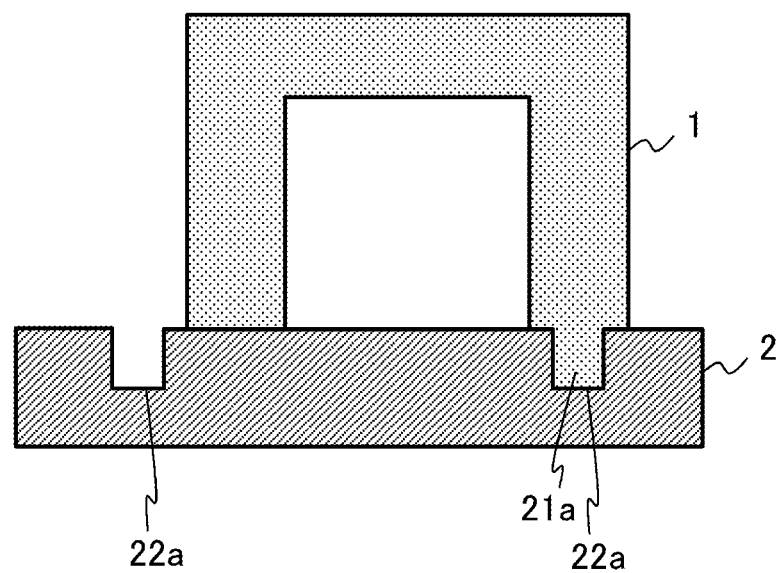

The method of fixing a housing according to Embodiment 5 is similar to the method of fixing a housing according to Embodiment 1, so that description thereof will be omitted. Note that the position can be fixed so long as there is no such misalignment in the position adjustment by which any part of the contact portion of the housing 1 cannot be introduced into the groove. Further, even if the shape of the pattern of the groove 22*a* is not matched with the shape of the contact portion of the housing 1, for example, even if the shape of the contact portion of the housing 1 is smaller than the shape of the pattern of the groove 22*a* as shown in FIG. 13A and FIG. 13B, the position can be fixed so long as a part of the contact portion of the housing 1 is introduced into a part of the groove.

As described above, by the method of fixing a housing according to Embodiment 5, since the groove 22*a* is formed at a position so that the contact portion of the housing 1 extends along the groove while straddling it, it is possible not only to significantly improve the accuracy of the position adjustment, but also to more firmly fix the position because the bonding area is more increased. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

Embodiment 6

In Embodiment 5, one pattern of the groove 22*a* is formed, whereas in Embodiment 6, a case will be described where multiple patterns of grooves are formed.

Figure 14A:
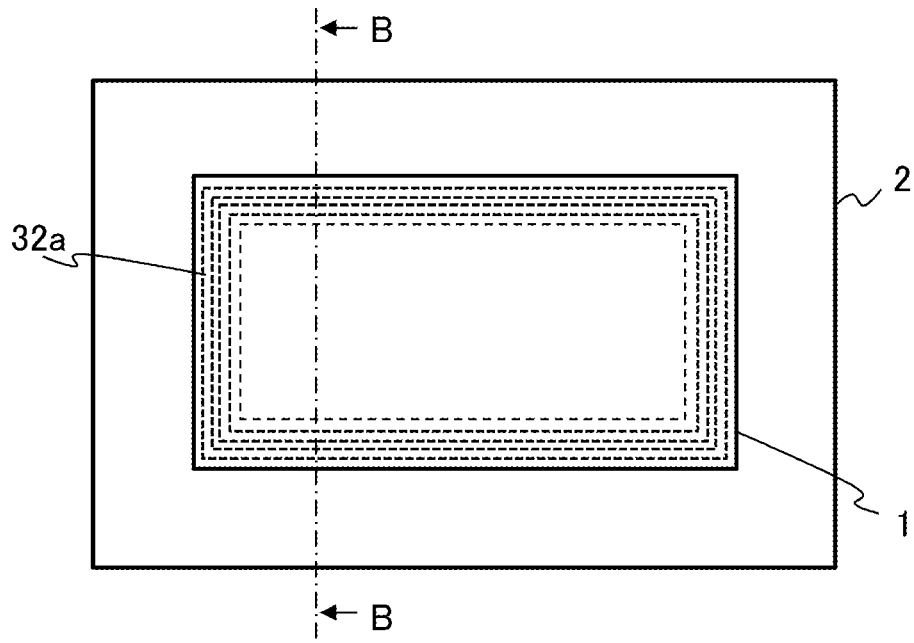
FIG. 14A and FIG. 14B are a set of plan and cross-sectional views showing a state after fixing by a method of fixing a housing according to Embodiment 6.
Figure 14B:
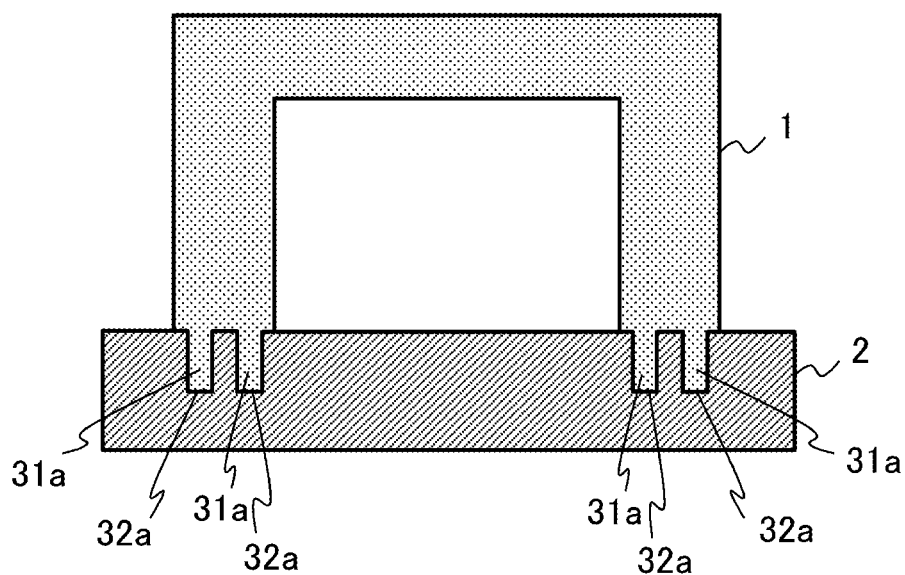

FIG. 14A and FIG. 14B are diagrams showing a housing fixed on a base plate by a method of fixing a housing according to Embodiment 6 of this application. FIG. 14A is a plan view and FIG. 14B is a B-B arrow directional cross-sectional view of FIG. 14A. As shown in FIG. 14A and FIG. 14B, a housing 1 is fixed to a base plate 2, in a state in which a contact portion of the housing 1 with the base plate 2 is partially embedded in patterns of double grooves 32*a* that are dug in the surface of the base plate 2, to form embedded portions 31*a*.

The base plate 2 has two patterns of the grooves 32*a* whose respective shapes in cross-section across the directions of the respective grooves are each a rectangle or a square. Two grooves 32*a* are formed at their respective positions so that the contact portion of the housing 1 extends along these grooves while straddling them. The total width of two grooves 32*a*22*a* has to be narrower than the wall thickness of the contact portion of the housing 1. Two grooves 22*a* may penetrate through the base plate 2. Note that in Embodiment 6, the number of the grooves 32*a* is two;

however, it is not limited thereto and may be three or more. A forming method of these grooves is performed using laser machining, etching, blast processing, a router, a drill, an end mill, or the like. These grooves may be formed as a plating pattern on the surface of the base plate.

Figure 15A:
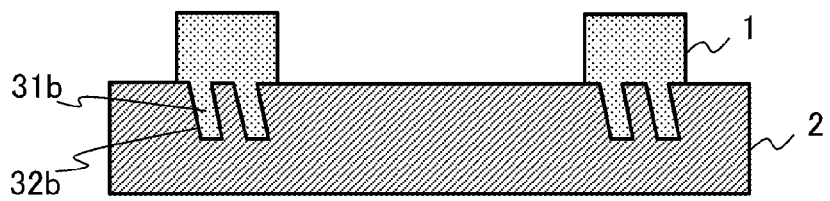
FIG. 15A to FIG. 15F are a set of partial cross-sectional views each showing another state after fixing by the method of fixing a housing according to Embodiment 6.
Figure 15B:
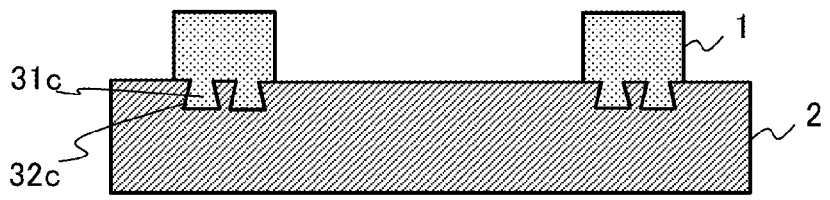
Figure 15C:
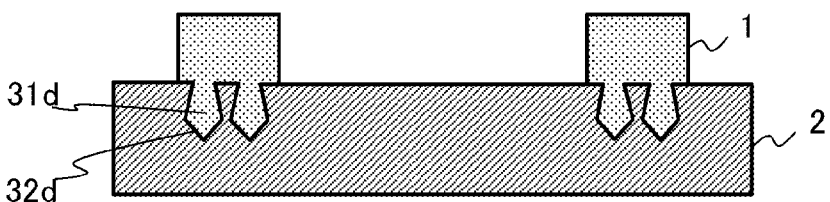
Figure 15D:
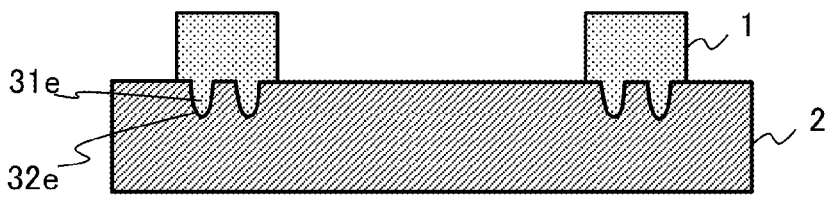
Figure 15E:
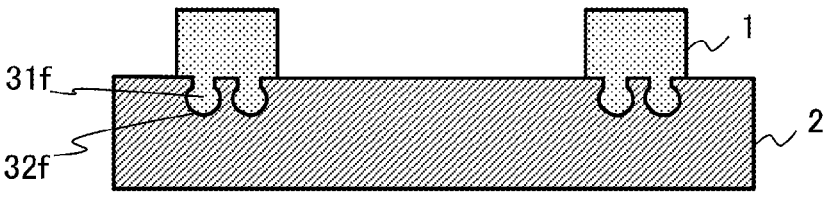
Figure 15F:
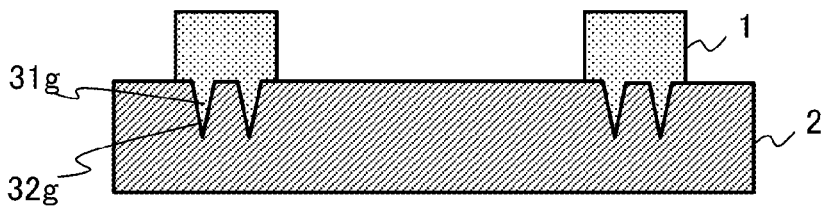

It is noted that, in Embodiment 6, the shape of each of two grooves 32a in cross-section across the direction of that groove is a rectangle or a square; however, it is not limited thereto. As shown in FIG. 15A to FIG. 15F, the shape of each of two grooves in cross-section n across the direction of that groove may be a parallelogram (FIG. 15A), a quadrilateral in which its side at the bottom portion of the groove is longer than its side on the surface of the base plate (FIG. 15B), a pentagon or polygon having sides more than a pentagon (FIG. 15C), a U-like shape (FIG. 15D), a circular shape (FIG. 15E) or a V-like shape (FIG. 15F).

The method of fixing a housing according to Embodiment 6 is similar to the method of fixing a housing according to Embodiment 1, so that description thereof will be omitted. Note that the position can be fixed so long as there is no such misalignment in the position adjustment by which any part of the contact portion of the housing 1 cannot be introduced into the groove.

As described above, by the method of fixing a housing according to Embodiment 6, since two grooves 32a are formed at their respective positions so that the contact portion of the housing 1 extends along these grooves while straddling them, it is possible not only to significantly improve the accuracy of the position adjustment in comparison with the case where the position has been determined beforehand by the engagement of a groove and its corresponding protrusion, but also to more firmly fix the position because the bonding area is more increased. Further, since a bonding material such as a solder, an adhesive or the like becomes unnecessary, it is possible to cut down the cost of the bonding material, to cut down the management cost of the bonding material, to omit the printing work or coating work thereof, and to reduce the time for bonding.

In this application, a variety of exemplary embodiments and examples are described; however, every characteristic, configuration or function that is described in one or more embodiments, is not limited to being applied to a specific embodiment, and may be applied singularly or in any of various combinations thereof to another embodiment. Accordingly, an infinite number of modified examples that are not exemplified here are supposed within the technical scope disclosed in the present description. For example, such cases shall be included where at least one configuration element is modified; where at least one configuration element is added or omitted; and furthermore, where at least one configuration element is extracted and combined with a configuration element of another embodiment.

DESCRIPTION OF REFERENCE NUMERALS AND SIGNS

1: housing, 2: base plate, 2a: groove, 2h: hole, 12a: groove, 12h: hole, 22a: groove, 32a: groove.

The invention claimed is:

1. A method of fixing a housing, comprising:
a step of adjusting a position of a housing, which is made of a resin and is placed on a base plate so as to partially cover the base plate, to an extent that a flat contact portion of the housing is in contact with the base plate and straddles a groove formed in a surface of the base plate, the groove having a width smaller than a width of the contact portion, the groove extending under a wall of the housing and the groove extending from an area exterior to the housing toward the housing;
a step of heating the base plate or the contact portion of the housing while pressing the housing against the base plate, to thereby deform the flat contact portion of the housing so that the contact portion is partially embedded in a portion of the groove extending under the housing; and
a step of cooling the heated base plate or contact portion of the housing.

2. The method of fixing a housing as set forth in claim 1, wherein a vertical sectional shape of the groove is a rectangle, a square, a parallelogram, a quadrilateral in which a side at a bottom portion of the groove is longer than a side on the surface of the base plate, a pentagon or polygon having more sidesmore than a pentagon, U-shaped, a circular shape or V-shaped.

3. The method of fixing a housing as set forth in claim 2, wherein the surface of the base plate includes multiple grooves including the groove.

4. The method of fixing a housing as set forth in claim 3, wherein, in the step of adjusting the position, the contact portion is placed to straddle at least one of the multiple grooves.

5. The method of fixing a housing as set forth in claim 1, wherein the groove penetrates through the base plate.

6. The method of fixing a housing as set forth in claim 5, wherein the surface of the base plate includes multiple grooves including the groove.

7. The method of fixing a housing as set forth in claim 6, wherein, in the step of adjusting the position, the contact portion is placed to straddle at least one of the multiple grooves.

8. The method of fixing a housing as set forth in claim 1, wherein the surface of the base plate includes multiple grooves including the groove.

9. The method of fixing a housing as set forth in claim 8, wherein,
in the step of adjusting the position, the contact portion is placed to straddle at least one of the multiple grooves.

10. The method of fixing a housing as set forth in claim 1, wherein the groove extends from the housing toward an area interior to the housing.

11. A method of fixing a housing, comprising:
a step of adjusting a position of a housing to an extent that a flat contact portion of the housing is in contact with a base plate and straddles a groove formed in a surface of the base plate, the housing being made of a resin and placed on the base plate so as to at least partially cover the base plate, the groove having a width smaller than a width of the contact portion, and the groove extending from an area interior to the housing toward the housing;
a step of heating the base plate or the contact portion of the housing while pressing the housing against the base plate, to thereby deform the flat contact portion of the housing so that the contact portion is partially embedded in a portion of the groove extending under the housing; and
a step of cooling the heated base plate or contact portion of the housing.

12. The method of fixing a housing as set forth in claim 11, wherein the groove extends from the housing toward an area exterior to the housing.

13. A method of fixing a housing, comprising:
a step of adjusting a position of a housing to an extent that a flat contact portion of the housing is in contact with a base plate and straddles multiple grooves formed in a surface of the base plate, the housing being made of a resin and placed on the base plate so as to at least partially cover the base plate, the multiple grooves each having a width narrower than a wall thickness of the contact portion, the multiple grooves extending under a wall of the housing and the multiple grooves extending from an area exterior to the housing toward the housing;

a step of heating the base plate or the contact portion of the housing while pressing the housing against the base plate, to thereby deform the flat contact portion of the housing so that the contact portion is partially embedded in a set of less than all of the multiple grooves and is partially embedded in a portion of each of the multiple grooves in the set; and a step of cooling the heated base plate or contact portion of the housing so that the contact portion is partially embedded in each of the multiple grooves in the set after the cooling step.

\* \* \* \* \*